Feb. 2, 1965   P. B. ZEIGLER ETAL   3,167,971
ADJUSTABLE STEERING COLUMN
Filed Sept. 6, 1962   2 Sheets-Sheet 1

INVENTORS
Philip B. Zeigler, &
BY Robert D. Wight

W. F. Wagner
ATTORNEY

INVENTORS
Philip B. Zeigler, &
Robert D. Wight
BY
ATTORNEY

United States Patent Office 3,167,971
Patented Feb. 2, 1965

3,167,971
ADJUSTABLE STEERING COLUMN
Philip B. Zeigler and Robert D. Wight, Saginaw, Mich., assignors to General Motors Corporation, Detroit, Mich., a corporation of Delaware
Filed Sept. 6, 1962, Ser. No. 221,833
9 Claims. (Cl. 74—493)

This invention relates to steering mechanism and more particularly to a steering column assembly wherein means are provided to enable selective adjustment of the steering wheel and an adjacent portion of the column about a horizontal axis extending transversely of the vehicle.

In the manufacture of production automobiles, it has long been the practice to mount the steering column and steering wheel in a compromise position or inclination relative to the vehicle seat due to the fact that an ideal position for the steering wheel during operation of the vehicle rarely, if ever, affords equally ideal conditions insofar as gaining access to the driver's seat. The compromise is further compounded by individual preference and marked dissimilarities in stature which may require considerable deviation from an "average" position.

An object of the present invention is to provide an improved steering mechanism for vehicles.

Another object is to provide a vehicle steering column assembly which enables selective adjustment of the angular inclination of a vehicle steering wheel.

A further object is to provide an adjustable steering column in which the steering wheel and adjacent upper portion of the steering column are tiltable about a horizontal transverse axis through a range of angular movement sufficient to accommodate a wide range of variation in physical stature of drivers.

Still another object is to provide an arrangement of the stated character including positive manually releasable locking means for retaining the tiltable portion of the assembly in the desired inclined position.

Yet a further object is to provide a structure of the type described wherein the tiltable portion automatically moves to the upwardmost tilted position upon sustained displacement of the manual release to provide maximum clearance for ingress and egress.

Yet another object is to provide a tiltable steering column assembly including paired latch means operable in alternating sequence through the successive range of positions provided.

A still further object is to provide a structure of the stated character including simplified and improved means for obtaining articulatable driving engagement between the steering shaft portions of the upper and lower steering column sections.

These and other objects, advantages and features of the invention will become more fully apparent as reference is had to the accompanying specification and drawings wherein.

Figure 1:
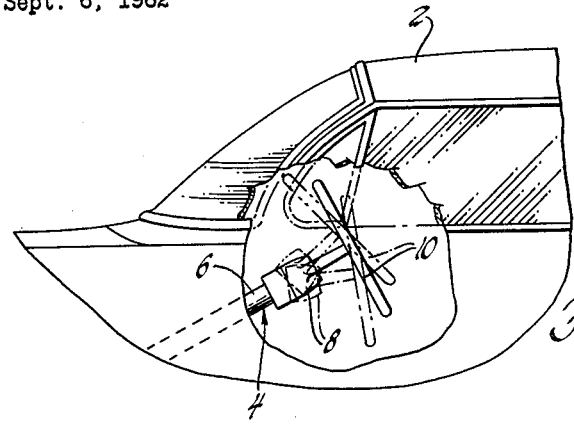
FIGURE 1 is a fragmentary side elevational view of a portion of a conventional vehicle, parts being broken away to show the general location and range of movement of a steering column assembly in accordance with the invention.

Referring now to the drawings and particularly FIGURE 1, there is shown a portion of a conventional motor vehicle identified by the reference numeral 2. Disposed in the usual position within the vehicle is a steering column assembly 4 comprising a fixed lower section 6 and a tiltable upper section 8 which includes the steering wheel 10. As shown in dotted lines, the upper section 8 and steering wheel 10 are adapted for tilting movement about a horizontal transverse axis both upwardly and downwardly from the conventional position wherein the steering wheel plane is normal to the axis of column 6.

Figure 2:
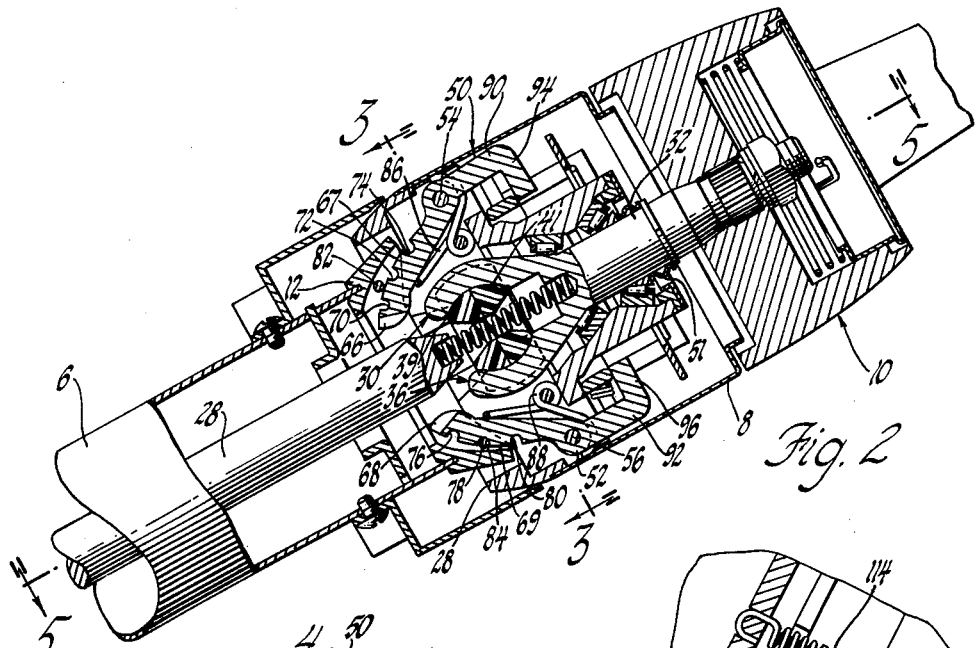
FIGURE 2 is an enlarged side elevational view, partly in section and with parts broken away, illustrating details of construction of a steering assembly in accordance with the invention.
Figure 5:
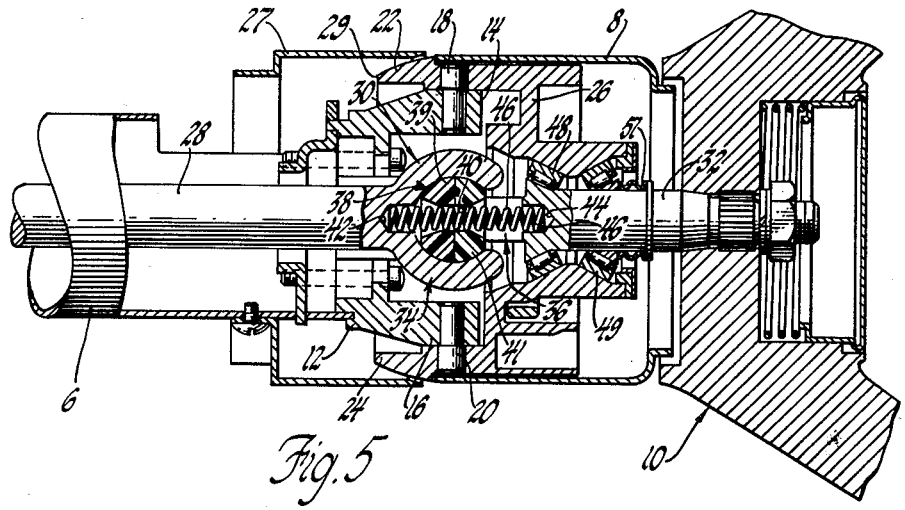
FIGURE 5 is a sectional view looking in the direction of arrows 5—5 of FIGURE 2.
Figure 6:
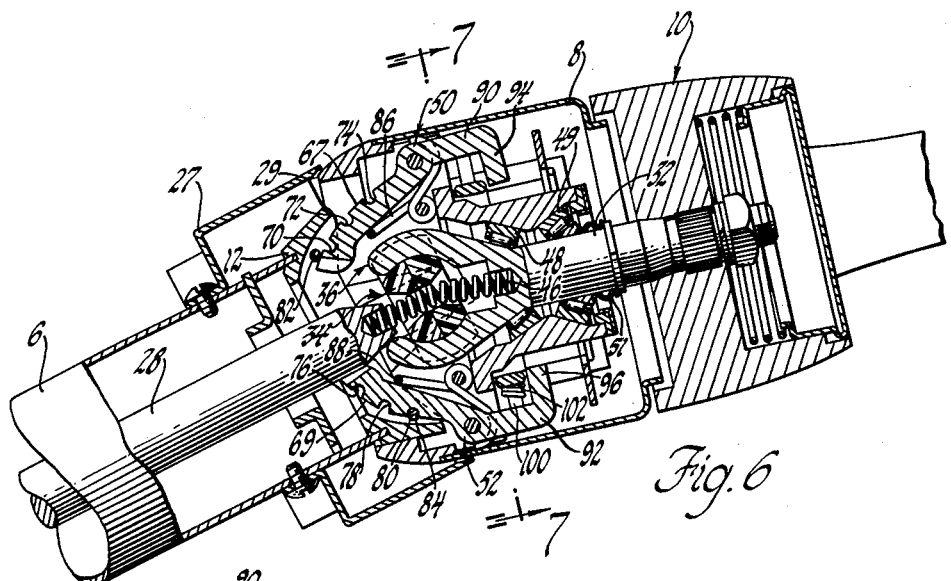
FIGURE 6 is a view similar to FIGURE 2 illustrating the mechanism in one of the inclined positions of adjustment.

In order to accomplish adjustment of the upper section 8 and wheel 10, previously described, and effect positive locking retention thereof in the desired position in accordance with the invention, as seen best in FIGURE 2, the upper extremity of column 6 has rigidly secured thereto an annular support housing 12 which, as seen best in FIGURE 5, includes upwardly projecting transversely opposite parallel ears 14 and 16 in which are journalled the inner ends of axially aligned transversely spaced trunnions 18 and 20. The outer ends of trunnions 18 and 20 in turn are received in downwardly projecting ears 22 and 24 formed on a bearing support 26 secured in upper column section 8. Since trunnions 18 and 20 extend transversely of the vehicle 2 in a horizontal plane, it will be evident that the upper section 8 and steering wheel 10 will tilt only in a vertical longitudinal plane relative to the vehicle. A generally cup-shaped member 27 of substantially the same diameter as column section 8 secured near the upper end of column section 6 surrounds the annular inturned lip portion 29 of bearing support 26 to effect concealment of the internal parts of the assembly irrespective of the angular inclination of upper section 8.

Contained within the lower column section 6 is the usual steering shaft 28, the lower end of which, not shown, is connected in a conventional manner with suitable steering mechanism, also not shown. Inasmuch as the steering shaft 28 is intended for rotational actuation by manual rotation of steering wheel 10, a universal joint 30 operatively connects the upper extremity of shaft 28 and the lower extremity of the stub shaft 32 associated with steering wheel 10. Universal joint 30 comprises bifurcated yokes 34 and 36 formed integrally on the adjacent end of shafts 28 and 32 which are disposed at right angles to each other and in encircling engagement with a cross-slotted plastic center section 38. Center section 38 is formed of two mating generally hemispherical halves 39 and 41 which have a common geometric center colinear with the projected axis of trunnions 18 and 20. For a more complete description of the general construction of the universal joint and means for effecting interconnecting engagement between the yokes and center section, reference may be had to copending application Serial No. 182,022, Stanley Stankiewicz, entitled "Universal Joint Steering Shaft," assigned to the assignee of the present invention. However, the universal connection 30 departs from conventional construction in that provision is made for imparting predetermined opposing axial load on steering shaft 28 and stub shaft 32 sufficient to eliminate "lash" typically present in universal connections of the general type illustrated. As seen in the drawings, the center section 38 is provided with a longitudinally extending aperture 40 which is aligned with drilled recesses 42 and 44 at the base of the respective yokes 34 and 36. During the course of assembly, a compression spring 46 is installed between recesses 42 and 44 and extends through the aperture 40 of center section 38. Since yoke 36 is accurately aligned relative to trunnions 18 and 20 by the combination axial and radial thrust bearings 48 and 49 arranged in back to back relation and preloaded by bellows spring 51, spring 46 urges shaft 28 downwardly until all lash between yoke 36, center section 38 and yoke 34 has been taken up. Spring 46 also functions to maintain the no-lash condition during angular movement of the upper section and steering wheel to an adjusted position and during subsequent rotational movement of shafts 28 and 32 in such adjusted positions, and to automatically compensate for any service wear.

Figure 3:
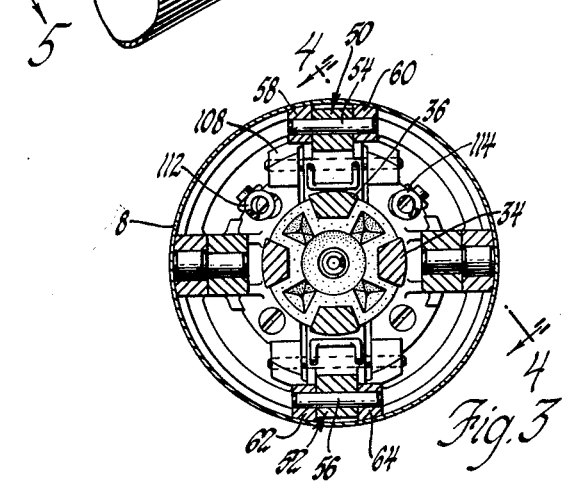
FIGURE 3 is an end elevational view looking in the direction of arrows of FIGURE 2.

In order to enable angular adjustment of the upper steering column section and assure positive and rigid retention thereof in each of such positions in accordance with the invention, there is provided a manually operable dual latch mechanism which is constructed and arranged so as to enable relatively fine increments of adjustment and yet maintain a very high level of structural strength in each of the adjusted positions. As seen best in FIGURE 2, a pair of locking shoes 50 and 52 are pivotally supported on bearing support 26 by pivot pins 54 and 56, vertically diametrically opposite the axis of trunnions 18 and 20. As seen best in FIGURE 3, the opposite ends of pins 54 and 56 are supported respectively in laterally projecting lugs 58 and 60 and 62 and 64, respectively. Locking shoes 50 and 52 include downwardly and inwardly extending portions 66 and 68 having outer curved surfaces 67 and 69 on which are formed substantially uniformly spaced notches 70, 72, and 74 and 76, 78, and 80, respectively. Anchored on support housing 12 at vertically opposite sides thereof in alignment with the shoes 50 and 52 are a pair of locking pins 82 and 84 adapted for interfitting engagement with the slots of the respective shoes. A pair of torsion spring elements 86 and 88 mounted on bearing support 26 are disposed so as to impose a yielding force biasing the lower end of the respective shoes into engagement with the adjacent locking pin. Accordingly, when the steering assembly is in normal axial alignment as shown in FIGURE 2, the locking pin 84 registers with notch 78 in shoe 52 and maintains the entire assembly in rigid axial alignment. It will be noted that when the assembly is in the normal axially aligned position, registration of pin 84 and notch 78 occurs while the opposite pin 82 occupies a position substantially midway between notches 70 and 72 of shoe 50. Consequently, when the shoe 52 is released from engagement with pin 84, tilting movement of the upper section in either direction results in angular translation of the shoes relative to pins 82 and 84 until the next pin and slot registration occurs. According to the invention, slots 70, 72, and 74 are staggered relative to slots 76, 78, and 80 so that angular movement of the upper steering column section equal to one half the distance between each of the slots brings about an increment of pin and slot registration. In this manner, the physical strength of the latching mechanism in each position of adjustment is inherently higher than would be possible with a single latch notch at intervals sufficiently close to produce a corresponding number of increments of adjustment.

Figure 7:
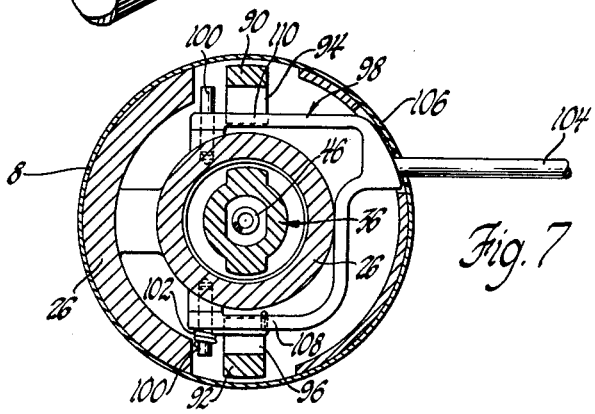
FIGURE 7 is an end elevation in section looking in the direction of arrows 7—7 of FIGURE 6.

In order to provide convenient manual control of the tilting adjustment, the shoes 50 and 52 are provided with integral upwardly projecting portions 90 and 92 having inturned fingers 94 and 96 which overlie a generally fork-shaped lever element 98. As seen best in FIGURE 7, element 98 is hinged to bearing support 26 by a pivot pin 100 lightly biased downwardly out of engagement with fingers 94 and 96 by spring 102. A handle portion 104 formed on fork 98 projects laterally outwardly through the jacket 106 of upper column section 8 for manual manipulation by the vehicle operator. As will be evident from FIGURE 7, upward swinging movement of handle 104 causes intermediate portions 108 and 110 of lever 98 to engage finger portions 94 and 96 of shoes 50 and 52 causing the latter to swing inwardly about pivots 54 and 56, thereby simultaneously displacing the lower curved portions from engagement with either pin 82 or 84. Slight angular movement of the upper section in either direction from any previously adjusted position followed by release of handle 104 enables the operator to obtain the next successive angular position by merely continuing angular movement of the upper section until the next successive pin and slot registration occurs, at which time the biasing force of either spring 86 or 88 will cause automatic locking engagement to occur.

Figure 4:
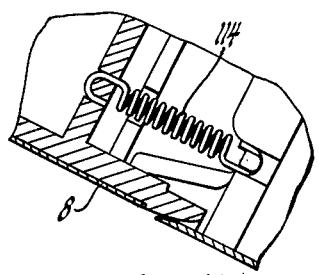
FIGURE 4 is a fragmentary view looking in the direction of arrows 4—4 of FIGURE 3.

According to another feature of the invention, means are provided to cause the upper column section and wheel to automatically rise to the upwardmost tilted position when handle 104 is lifted and maintained upwardly for a short duration. As seen best in FIGURES 3 and 4, a pair of coil springs 112 and 114 are disposed in tension between bearing support 26 and lower support 12 above the axis of trunnions 18 and 20. Springs 112 and 114 yieldably bias the upper section to its maximum upward inclination whenever handle 104 is displaced and maintained in the release position. Consequently, when the vehicle operator prepares to enter the vehicle, maximum clearance between the steering wheel 10 and the vehicle seat, not shown, is instantly provided by merely displacing the handle 104 upwardly before entering the vehicle. As soon as the operator assumes the driving position, the steering wheel 10 and upper section 8 are conveniently adjusted to the desired position either in successive downward increments, or alternatively, several increments may be bypassed by maintaining handle 104 in a released position while urging the wheel downwardly to approximately the desired angular position, at which time the handle is released and locking engagement occurs upon reaching the next normal increment of locking engagement.

From the foregoing it will be seen that a novel and improved steering mechanism has been provided. It is especially to be noted that while providing very fine increments of adjustment, the latching mechanism of the invention is not only very rugged but in addition is sufficiently compact as to allow total concealment within the confines of column structure of conventional dimensions.

While but one embodiment of the invention has been shown and described, it will be apparent that other changes and modifications may be made therein. It is, therefore, to be understood that it is not intended to limit the invention to the embodiment shown, but only by the scope of claims which follow.

What is claimed is:

1. An adjustable steering assembly comprising a fixed lower column section and an upper column section, means operatively linking said sections, a lower steering shaft rotatable in said lower column, an upper steering shaft journalled in said upper column, a universal joint connecting said upper and lower steering shaft, and means for retaining said upper section in a plurality of angular positions relative to said lower section, said means including a dual latch mechanism having paired elements operable in alternating sequence through said range of said angular positions.

2. An adjustable steering assembly comprising a fixed lower column section and an upper column section arranged in end to end relation, pivot means operatively linking the adjacent ends of said sections, a lower steering shaft rotatable in said lower column, an upper steering shaft journalled in said upper column, a universal joint co-linear with said pivot means connecting said upper and lower steering shaft, and means for retaining said upper section in a plurality of angular positions relative to said lower section, said means including a dual latch mechanism having paired elements operable in alternating sequence through said range of said angular positions.

3. An adjustable steering assembly comprising a fixed lower column section and an upper column section arranged in end to end relation, transversely extending pivot means operatively linking the adjacent ends of said sections, a lower steering shaft rotatable in said lower column, an upper steering shaft journalled in said upper column, a universal joint colinear with said pivot means connecting said upper and lower steering shaft, and manually releasable means for retaining said upper section in any of a plurality of angular positions relative to said lower section, said means including a dual latch mechanism having paired elements operable in alternating sequence through the range of said angular positions.

4. An adjustable steering assembly comprising a fixed lower column section and an upper column section arranged in end to end relation, spaced apart transversely extending pivot means operatively linking the adjacent ends of said sections, a lower steering shaft rotatable in said lower column, an upper steering shaft journalled in said upper column, a universal joint colinear with said pivot means connecting said upper and lower steering shaft, and manually releasable positive latch means for retaining said upper section in any of a plurality of angular positions relative to said lower section, said means including a pair of locking shoes pivotally mounted on one section and a pair of locking pins fixedly mounted on the other section, said shoes having spaced pin engaging slots formed thereon in staggered relation whereby retention of said sections in successive angular positions is accomplished by alternate locking engagement of said locking shoes with their respective locking pins.

5. An adjustable steering assembly comprising a fixed lower column section and an upper column section arranged in end to end relation, spaced apart transversely extending pivot means operatively liking the adjacent ends of said sections, a lower steering shaft rotatable in said lower column, an upper steering shaft journalled in said upper column, a steering wheel fixed to said upper shaft for rotation about the axis of the latter, a universal joint colinear with said pivot means operatively connecting said upper and lower steering shaft, means for retaining said upper section in any of a plurality of angular positions relative to said lower section, said means including a dual latch mechanism having paired elements operable in alternating sequence through said range of said angular positions, manual control means for releasing said latch mechanism, and means for automatically displacing said upper section to its angular limit in one direction upon release of said latching mechanism.

6. An adjustable steering assembly comprising a fixed inclined lower column section and an upper column section arranged in end to end relation, transverse pivot means operatively linking the adjacent ends of said sections for relative angular movement about a horizontal transverse axis, a lower steering shaft rotatable in said lower column, an upper steering shaft journalled in said upper column, a steering wheel fixed to said upper shaft in a plane normal to the axis of the latter and rotatable therewith, a universal joint means having its geometric center colinear with said pivot means connecting said upper and lower steering shaft, manually releasable positive latch means for retaining said upper section in a plurality of anguar positions relative to said lower section, said means including a pair of locking shoes pivotally mounted on one section and a pair of locking pins fixedly mounted on the other section, spring means urging said shoes into engagement with said pins, said shoes having depending portions formed with spaced pin engaging slots, the slots of one shoe being staggered in relation to the slot of the other shoe whereby retention of said sections in successive angular position is accomplished by alternate locking engagement of said locking shoes with their respective locking pins, and manually operable means for displacing the depending portions of said shoes away from said pins a distance greater than the depth of said slots.

7. The structure set forth in claim 6 wherein said universal joint comprises a generally spherical center having crossed circumferential grooves engaged by crossed yokes formed respectively on said steering shaft and said stub shaft, and spring means extending through said center exerting opposed axial biasing force on said shafts.

8. The structure set forth in claim 6 wherein said manually operable means includes a finger engageable handle projecting transversely of said upper section below said steering wheel.

9. The structure set forth in claim 8 wherein said manually operable means is formed and arranged for actuation by displacement of said handle in a plane perpendicular to the plane of rotation of said steering wheel.

References Cited in the file of this patent

UNITED STATES PATENTS

| 1,025,215 | Stull | May 7, 1912 |
| 1,367,695 | Gray | Feb. 8, 1921 |
| 2,079,536 | Thurber | May 4, 1937 |
| 2,910,887 | Helms | Nov. 3, 1959 |
| 3,044,317 | Trenaskis | July 17, 1962 |
| 3,078,945 | Frey | Feb. 26, 1963 |